United States Patent [19]

Torkelson

[11] Patent Number: 5,167,118
[45] Date of Patent: Dec. 1, 1992

[54] JET ENGINE FIXED PLUG NOISE SUPPRESSOR

[75] Inventor: Delbert W. Torkelson, Claremore, Okla.

[73] Assignee: Nordam, Tulsa, Okla.

[21] Appl. No.: 692,185

[22] Filed: Apr. 26, 1991

Related U.S. Application Data

[63] Continuation of Ser. No. 432,367, Nov. 6, 1989, abandoned.

[51] Int. Cl.$^5$ .......................... F02K 3/02; F01N 1/04
[52] U.S. Cl. ..................................... 60/226.1; 60/271; 181/213
[58] Field of Search ............... 60/226.1, 262, 271; 181/213, 214

[56] References Cited
U.S. PATENT DOCUMENTS

| | | | |
|---|---|---|---|
| 3,750,402 | 8/1973 | Vdoviak et al. | 60/261 |
| 4,433,751 | 2/1984 | Bonneau | 118/213 |
| 4,696,159 | 9/1987 | Horgan | 60/226.1 |

Primary Examiner—John J. Vrablik
Assistant Examiner—Howard R. Richman
Attorney, Agent, or Firm—Head and Johnson

[57] ABSTRACT

A noise suppressor for use with a turbofan engine, the suppressor being formed of a tubular exhaust shroud affixed to the engine exhaust end, the shroud providing an internal circumferential surface, a flow mixture affixed to the engine exhaust end, an elongated centerbody supported within the exhaust shroud and having an external cross-sectional area less than the internal cross-sectional area of the shroud providing an annular area through which thrust producing exhaust gases of the engine pass, acoustic lining affixed to a substantial portion of the internal circumferential area of the exhaust shroud in the portion thereof receiving the centerbody, and acoustical lining affixed to a substantial portion of the exterior area of the centerbody in the area thereof received within the exhaust shroud so that thereby the thrust producing gases pass through an area of reduced channel height. A substantial portion of the annular area through which the gases pass is encompassed by acoustical lining.

15 Claims, 3 Drawing Sheets

JET ENGINE FIXED PLUG NOISE SUPPRESSOR

This is a continuation of copending application Ser. No. 07/432,367 filed Nov. 6, 1989 now abandoned.

SUMMARY OF THE INVENTION

Noise generated by aircraft jet engines during take-off and landing is a matter of serious concern in most metropolitan areas of the world. In the United States alone, approximately 5 million people live or work adjacent airports and are affected significantly by aircraft noise. Many municipalities have taken action to require reduction in aircraft noise.

Much work has been done on designing turbofan and turbojet aircraft engines to reduce noise levels. For background information relating to noise reduction systems for jet engines, reference may be had to the following U.S. Pat. Nos. 3,710,890; 4,077,206; 4,117,671; 4,501,393. These previously issued United States patents are exemplary of the prior art relating to the general concept of the modification of jet aircraft engines to reduce noise intensities, and are incorporated herein by reference.

One apparatus which has been developed and which has achieved beneficial results in the noise reduction of turbofan aircraft engines is the use of flow mixers, some of which are of the multiple channel or multiple lobe inverted flow type. Examples of the use of such mixers for noise suppression are found in the previously referenced U.S. Pat. Nos. 4,117,671 and 4,077,206. These flow mixers have been credited with noise reduction in the range of 3.5 to 4.5 dB in the Effective Perceived Noise Level (EPNL), depending upon the engine cycle and bypass ratio. While this noise reduction is helpful, it is not sufficient within itself to solve all of the low bypass turbofan engine noise problems, and for this reason the multi-lobe mixing nozzle has had a limited commercial application.

The present disclosure utilizes the benefits of the flow mixer design in combination with a fixed plug and critically placed sound absorption material to substantially reduce the noise level of a turbofan engine. The present disclosure is directed toward a noise reduction system for a turbofan engine in which the engine has an aft exhaust end and a longitudinal engine axis. The noise suppressor system includes a tubular exhaust shroud affixed to the turbofan engine exhaust end, the shroud having an internal circumferential surface. Positioned within the shroud and in the portion thereof adjacent the engine exhaust end is a flow mixer.

Supported concentrically within the exhaust shroud is an elongated centerbody having an external cross-sectional area less than the internal cross-sectional area of the exhaust shroud thereby providing an annular area having substantially reduced channel flow height through which thrust producing exhaust gases of the engine pass. The walls of the shroud and plug may be parallel or may be arranged in a converging manner in the aft direction to allow the best match of aerodynamic and acoustic requirements.

Acoustical lining is affixed to at least a substantial portion of the internal circumferential area of the shroud in the area thereof receiving the centerbody. In like manner, acoustical lining is affixed to at least a substantial portion of the external surface area of the centerbody in the area thereof received within the exhaust shroud. This arrangement results in at least a substantial portion of the reduced channel height annular area through which thrust producing jet engine exhaust pass being surrounded by acoustical lining.

In the preferred arrangement, a centerbody is formed of various or multiple portions having different functions, that is, a forward aerodynamically-shaped portion tailored to minimize aerodynamic losses positioned in the direction toward the engine exhaust end, an intermediate portion which, by example, can be substantially cylindrical, and an aft aerodynamically-shaped portion. Acoustical lining is secured to at least substantially all of the external surfaces of the center portion of the centerbody to absorb internal preemergence noise.

In a further preferred embodiment, the centerbody, in addition to being formed of the various portions above described, includes the arrangement wherein the aft aerodynamic portion is of increased cross-sectional area compared to the forward aerodynamic portion and the cylindrical portion, and such increased cross-sectional area is substantially coincident with the aft end of the exhaust shroud.

The key principles of this disclosure are:

(a) An internal mixer reduces low frequency exit nozzle jet noise, and shifts the noise to higher frequency levels.

(b) The centerbody provides a channel of reduced height through which the engine noises pass. The channel is lined with sound absorbing material. Higher frequency sounds are more effectively absorbed by the sound absorbing material due to the reduced channel height. In addition, the shift of the sound towards higher frequencies achieved by the mixer enables the use of a centerbody of shorter length to attain a preselected level of sound attenuation than can otherwise be achieved.

A better understanding of the invention will be had by reference to the following detailed description and claims, taken in conjunction with the attached drawings.

DESCRIPTION OF THE PREFERRED EMBODIMENT

Figure 1:
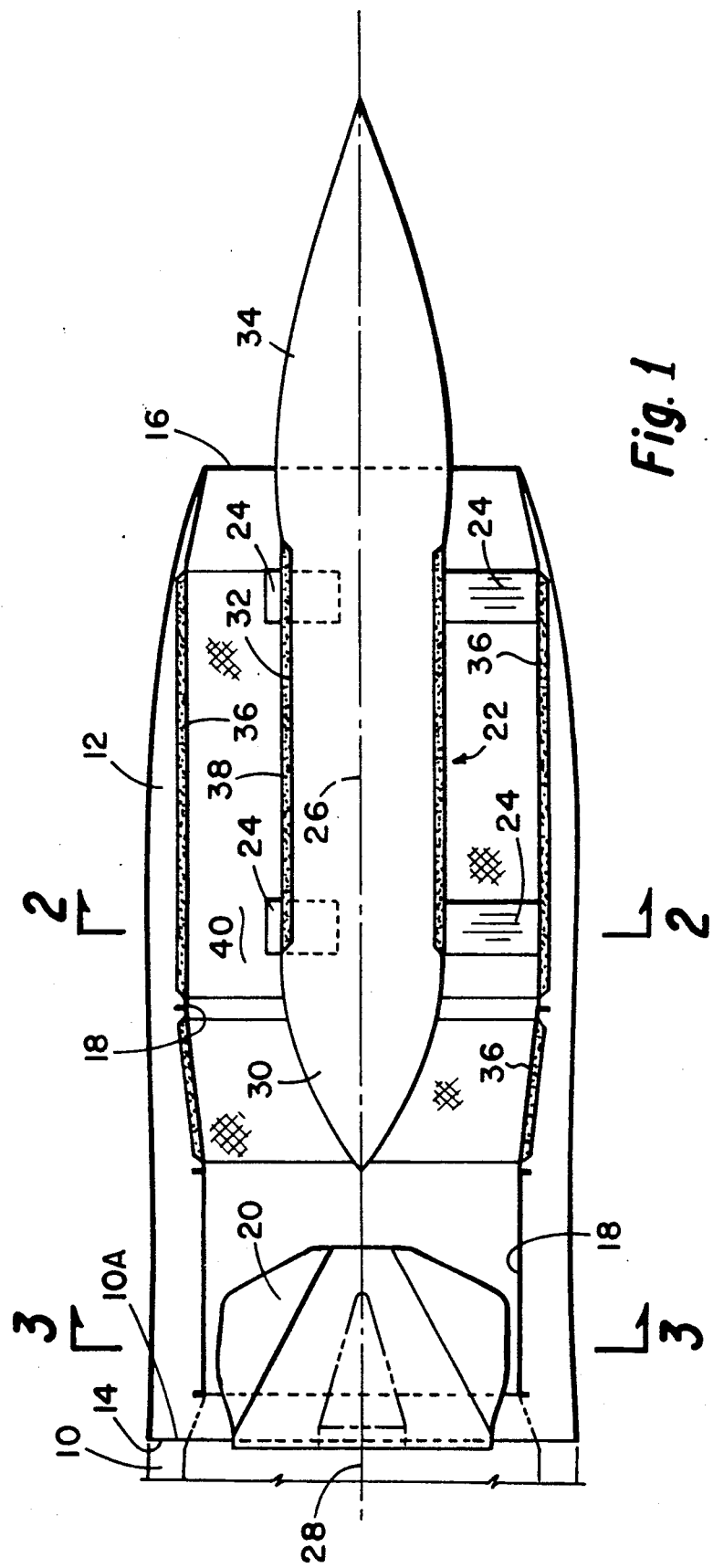
FIG. 1 is an elevational cross-sectional view of a noise suppressor system embodying the principles of this invention showing an exhaust shroud, a flow mixer, a centerbody and acoustical lining as the important elements thereof which are secured to a turbofan engine aft end.

Referring to the drawings and first to FIG. 1, a cross-sectional elevational view illustrates a preferred embodiment for practicing the principles of this invention. The aft portion of a turbofan engine is generally indicated by the numeral 10 and the engine aft end by the numeral 10A. To reduce the noise generated by such engine, according to the principles of this invention, there is affixed to the jet engine aft end 10A a tubular exhaust shroud 12 having a forward end 14 and an aft end 16. The exhaust shroud has an internal circumferential surface 18.

Supported within the shroud 12 and adjacent to the engine aft end 10A is a multi-lobe flow mixer 20. The essential function of the flow mixer 20 is to mix the core gas and fan air to reduce exit jet noise and to increase the frequency of the preemergence sound generated by the engine 10. For background information as to the examples of the configuration and construction of flow mixers of the type identified by the numeral 20, reference may be had to U.S. Pat. Nos. 4,077,208 and 4,117,671.

The number of lobes employed on the flow mixer 20 can vary, and the details of construction of the flow mixer, and particularly the number of lobes, will be determined by the characteristics of the turbofan engine 10 to which the noise reduction system is designed, with the basic general purpose, as above indicated, being that of raising the frequency of the sound produced by the jet engine. The flow mixer 20 may be physically affixed to the rearward end of the turbofan engine 10 or supported by the exhaust shroud 12.

Figure 2:
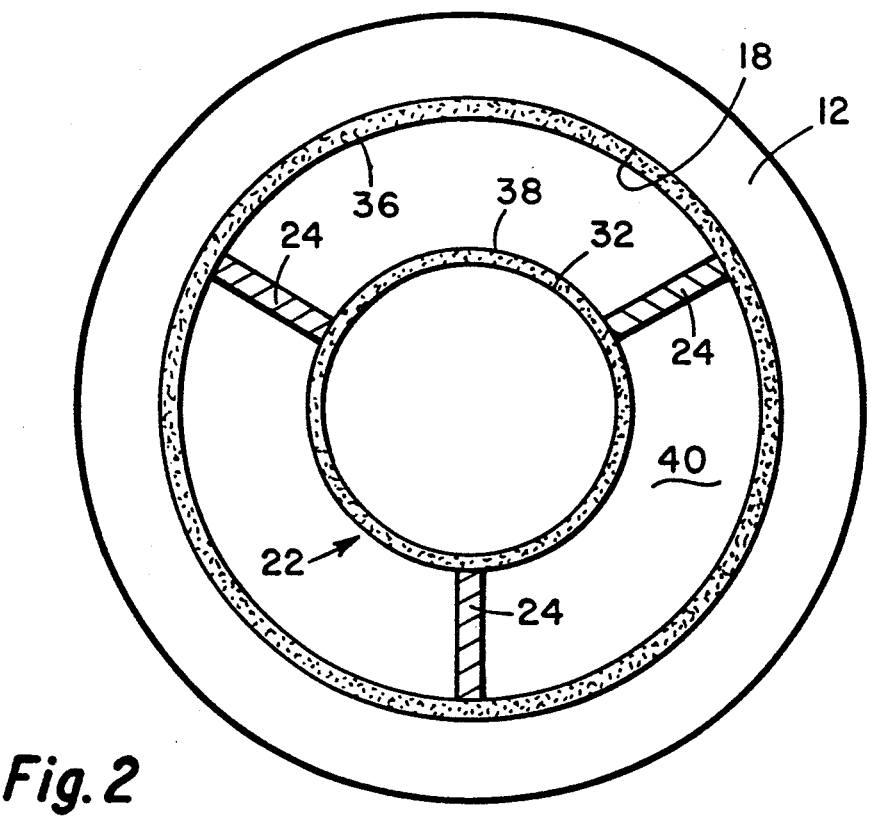
FIG. 2 is cross-section view taken along the line 2—2 of FIG. 1 showing means of supporting the centerbody within the exhaust shroud.
Figure 3:
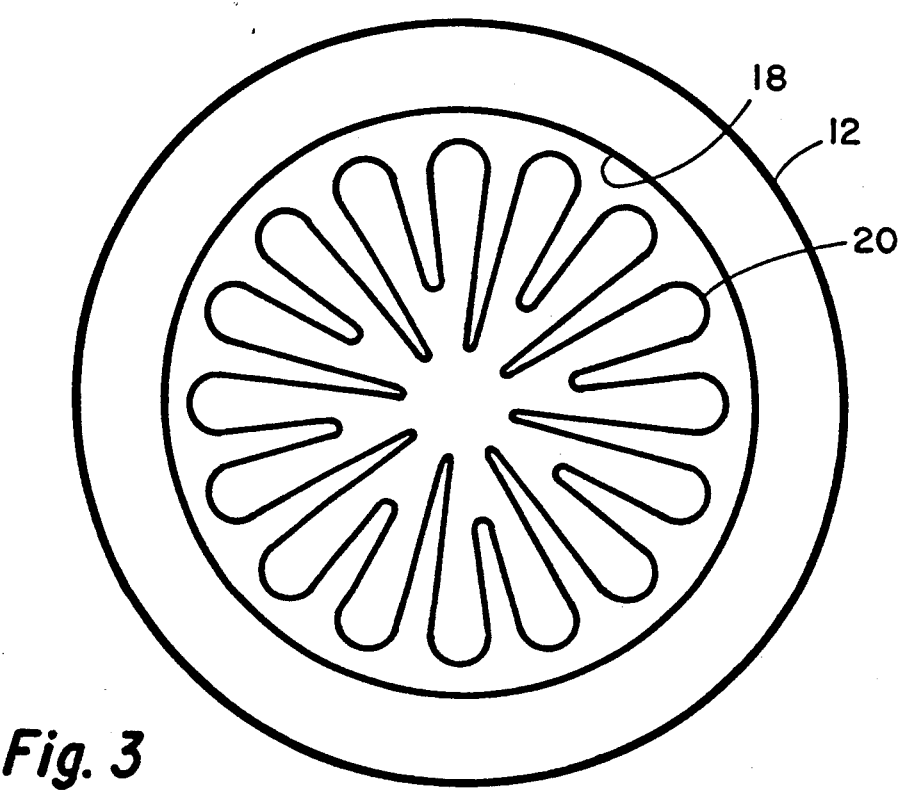
FIG. 3 is a cross-sectional view taken along the line 3—3 of FIG. 1 showing more detail of one configuration of a flow mixer as employed with this invention.

Positioned within the interior of the exhaust shroud 12 and aft of the flow mixer 20 is a centerbody generally indicated by the numeral 22. The centerbody is supported, as illustrated in FIG. 2, by struts 24. The centerbody has a longitudinal axis 26 which may or may not be coincident with the longitudinal axis 28 of the turbofan engine 10. Further, the centerbody 22 preferably is substantially symmetrical about all cross-sections taken perpendicular to the longitudinal axis 26.

The centerbody 22 may be formed of a number of basic portions. In the illustrated embodiment, the centerbody is formed of a forward aerodynamically-shaped portion 30, a center, elongated cylindrical portion 32 which can also be of conical rather than cylindrical shape, and an aft aerodynamically-shaped portion 34. The primary function of centerbody 22 is to provide a reduced channel height annular area.

Of critically to the present disclosure is the provision of acoustical lining 36 formed on at least a substantial portion of the interior circumferential surface 18 of the exhaust shroud.

In addition, of corresponding critically is acoustic lining 38 formed on at least a substantial portion of the external surface area of centerbody 22.

The acoustic linings 36 and 38 are preferably in the form of commercially available sound absorbent honeycomb expanded metal core joined to a perforated inner skin, however, the acoustic linings may be formed of systems using perforated screens. The thickness of the honeycomb material varies with the dominant frequency to be suppressed, typically from about 0.3 inches to 3 inches in thickness depending on the range of frequencies. If formed of such honeycomb material, the size of the contiguous hexes is preferably about ¼ to ⅜ of an inch. The depth and/or height of the honeycomb material, that is, 0.3 inches to 3 inches as an example, and the cell size, that is, ¼ to ⅜ inch as an example, are selected to tune the sound absorption material to the predominate noise frequencies to be attenuated. Thus, in designing a system to incorporate the principles of this invention for a particular engine, the sound frequencies having the highest Perceived Noise Level Tone-corrected (PNLT) will determine the depth of the expanded honeycomb acoustical lining, as well as and in combination with the cell size. The thickness and cell size, that is, the predominate frequency absorbent characteristics, of the sound absorbing material may be varied from point to point within the annular area 40 to attenuate a band of sound frequencies.

The acoustic linings 36 and 38 are made of metal, with the metal being selected to be that which will tolerate turbofan engine exhaust applications, such as typically 200° F. to 1250° F. The acoustic lining can be bonded to the shroud internal circumferential surface 18 and the external circumferential surface of the centerbody 22, such as by epoxy or, if exhaust temperatures exist which preclude use of epoxy, the acoustical lining material may be brazed, welded, or mechanically held in place with fasteners.

By the use of the centerbody 22 a reduced channel height annular area 40 is provided between the exterior of the centerbody and the interior circumferential surface 18 of the exhaust shroud. This annular area 40 provides a pre-selected channel height, that is, the spacing between the centerbody external surface and the exhaust shroud internal circumferential surface. This channel height relative to the length of the annular area having acoustical lining on the opposed surfaces is critical to achieving the noise reduction desired. Generally, the greater the channel height, the longer the length of the area of opposed acoustical linings on the centerbody and within the exhaust shroud required. Where the system is designed primarily to reduce the intensities of higher frequency sounds, the channel height of the annular area 40 preferably is reduced as much as possible, and the total length of the annular area having acoustical linings on both sides can be reduced. Correspondingly, when the frequency of the sound which requires reduction is lowered, the channel height of the annular area 40 can be correspondingly increased, and the length of the acoustical lined areas increased.

As previously indicated, a basic function of the flow mixer 20 is to increase the frequency of sound produced by turbofan engine 10 since a high frequency sound is easier to attenuate than a lower frequency sound. The combination of the use of the flow mixer 20 with the centerbody 22 and with the acoustically lined reduced channel height annular area 40 provides a highly improved means of substantially reducing the EPNL of a jet engine.

In the preferred arrangement as illustrated, the cross-sectional area of the centerbody cylindrical portion 32 and the maximum cross-sectional area of the centerbody forward aerodynamically-shaped portion 30 are approximately the same, however, the maximum cross-sectional area of the centerbody aft portion 34 is greater. This increased cross-sectional area preferably occurs in the centerbody aft portion 34 substantially coincident with the exhaust shroud aft end 16 for efficiency of the overall exhaust nozzle. This means that the cross-sectional area of the annular space 40 is at a minimum at the exhaust shroud aft end 16.

Research directed to the application of the principles of this invention as set forth herein has indicated that the employment of the exhaust shroud 12, the flow mixer 20, the centerbody 22, and the acoustical linings 36 and 38 provides a noise reduction system of relatively low weight compared to other contemporary designs of equal capability, with a low drag characteristic, and with a take-off and cruise performance penalty of not greater than about 1 to 3% thrust reduction. Further, research has indicated that the employment of the principles of the invention disclosed herein are calculated to reduce the maximum engine power setting EPNL approximately 6.5 to 7.0 dB, to reduce the cutback power setting noise level 4.0 to 6.0 dB, and to reduce the approach power setting noise approximately 1 to 2 dB.

Figure 4:
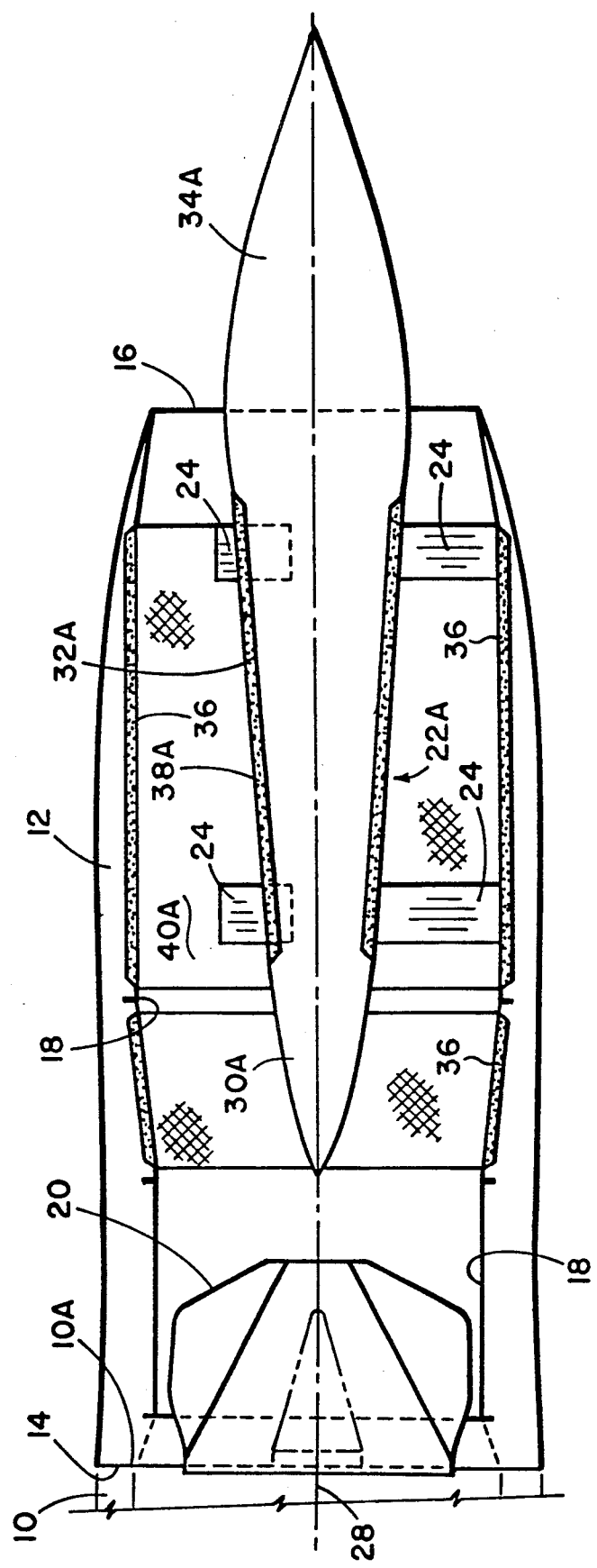
FIG. 4 is a cross-sectional view as in FIG. 3 showing an alternate configuration of the centerbody with a frusto-conical intermediate portion.

FIG. 4 shows the application of the principles of this invention with a modified form of centerbody 22A. The centerbody is supported within the ejector shroud by means of struts 24, as previously described, with its longitudinal axis 26A preferably coincident with the engine longitudinal axis 10.

Centerbody 22A has an aerodynamically-shaped forward end 30A and an aft aerodynamically-shaped portion 34A as described above with reference to elements 22, 30 and 34, and an intermediate or center portion 32A which, in contrast with cylindrical intermediate portion 32 is frustro-conical in external shape and identified by 32A.

At least a substantial portion of the exterior surface of centerpiece 22A is covered with acoustical lining material. In FIG. 4, substantially all of the exterior surface of the centerbody frustro-conical intermediate portion 22A is covered by acoustic lining material 38A.

The embodiment of FIG. 4 shows an arrangement in which the walls between the exterior of the centerbody and the internal wall of shroud are not parallel but provide a tapered annular area 40A. Centerbody 22A with its conical wall converging in the forward direction allow improved match of the channel height of annular area 40A to the various frequencies of the noise of the turbofan engine 10 to be attenuated.

The advantages of the noise reduction system of this disclosure are obtained without the use of moving parts, and, therefore, with the obvious advantages of reduced failure opportunities and reduced maintenance requirements.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use with a turbofan engine having an exhaust end and a longitudinal engine axis, a noise suppressor system comprising:

a tubular exhaust shroud affixed to the engine exhaust end, the shroud having an internal circumferential area and having a forward end and an aft end;

an elongated centerbody supported within said exhaust shroud and having an external cross-sectional area less than the internal cross-sectional area of said exhaust shroud providing an annular area of desired channel height through which thrust producing exhaust gases of the engine pass;

acoustical lining affixed to at least a substantial portion of said internal circumferential area of said shroud in the area thereof receiving said centerbody and acoustical lining affixed to at least a substantial portion of said centerbody in the area thereof received within said exhaust shroud, whereby at least a portion of said annular area through which thrust producing engine exhaust gases pass is acoustically lined; and said acoustical linings affixed to said exhaust shroud and said centerbody having different sound frequency attenuation characteristics from one point to another within said annular area whereby sound of different frequencies is absorbed at different points within said annular area and whereby a preselected band of sound frequencies is attenuated.

2. A noise suppressor system according to claim 1 including:

a mixing nozzle positioned between the engine exhaust end and said centerbody to cause engine gas mixing to increase the frequency of the internal noise source and to thereby change the frequency of the engine noise to that which is more efficiently attenuated in the acoustically lined annular area within the exhaust shroud.

3. A noise suppressor system according to claim 1 wherein said centerbody has a longitudinal axis which is substantially coincident with the jet engine longitudinal axis.

4. A noise suppressor according to claim 3 wherein said centerbody is substantially circular in all cross-sections normal to said longitudinal axis thereof and is aerodynamically contoured on each end.

5. A noise suppressor system according to claim 1 wherein said centerbody has a forward aerodynamically-shaped portion in the direction toward the engine exhaust end, an intermediate substantially cylindrical portion, and an aft aerodynamically-shaped portion.

6. A noise suppressor system according to claim 5 wherein at least a substantial portion of an exterior surface of said centerbody intermediate substantially cylindrical portion is covered by sound absorbing material.

7. A noise suppressor according to claim 5 wherein a portion of said centerbody aft aerodynamically-shaped portion is of an external diameter greater than the external diameter of said centerbody intermediate substantially cylindrical portion.

8. A noise suppressor system according to claim 7 wherein said portion of said centerbody aft aerodynamically-shaped portion having an external diameter greater than the external diameter of said centerbody intermediate substantially cylindrical portion is in a plane substantially coincident with said exhaust shroud aft end, forming an exhaust nozzle.

9. A noise suppressor system according to claim 1 wherein said elongated centerbody has a forward aerodynamically-shaped portion in the direction toward the engine exhaust end, an intermediate portion, and an aft aerodynamically-shaped portion, the centerbody intermediate portion being of generally truncated conical external configuration converging in the direction toward the engine and wherein said acoustic lining affixed to said centerbody is affixed at least to said truncated conical shaped intermediate portion, the channel height dimensions of said annular area being thereby varied by the conical configuration of said centerbody intermediate portion.

10. For use with a turbofan engine having an aft exhaust end and a longitudinal engine axis, a noise suppressor system comprising:

a tubular exhaust shroud affixed to the engine exhaust end, the shroud having an internal circumferential area and having a forward end and an aft end;

an elongated centerbody supported within said exhaust shroud and having an external cross-sectional area less than the internal cross-sectional area of said exhaust shroud providing an annular area of desired channel height through which thrust producing exhaust gases of the engine pass, wherein the centerbody has a forward aerodynamically-shaped portion in the direction toward the engine exhaust end, an elongated intermediate portion, and an aft aerodynamically-shaped portion, the centerbody elongated intermediate portion being of generally truncated conical external configuration converging in the direction toward the engine; and acoustical lining affixed to at least a substantial portion of said internal circumferential area of said shroud in the area thereof receiving said centerbody and acoustical lining affixed to at least a substantial portion of said centerbody elongated intermediate portion, whereby at least a portion of said annular area through which thrust producing engine exhaust gases pass is encompassed by acoustical lining, the acoustical lining varying in sound attenuating characteristics, said truncated conically shaped intermediate portion of said centerbody providing an elongated portion of said annular area within said exhaust shroud wherein the spacing between said shroud and said centerbody varies to provide for noise suppression over a selected frequency range.

11. A noise suppressor system according to claim 10 including:

a mixing nozzle positioned between the engine aft exhaust end and said centerbody to cause engine gas mixing to increase the frequency of the internal noise source and to thereby change the frequency of the engine noise to that which is more efficiently attenuated in the acoustically lined annular area within the exhaust shroud.

12. A noise suppressor system according to claim 10 wherein said centerbody has a longitudinal axis which is substantially coincident with the jet engine longitudinal axis.

13. A noise suppressor system according to claim 10 wherein said centerbody is substantially circular in all cross-sections normal to the longitudinal axis thereof.

14. A noise suppressor system according to claim 10 wherein a portion of said centerbody aft aerodynamically-shaped portion is at least in part of an external diameter greater than the maximum external diameter of said centerbody intermediate portion.

15. A noise suppressor system according to claim 14 wherein said portion of said centerbody aft aerodynamically-shaped portion having at least in part an external diameter greater than the maximum external diameter of said centerbody intermediate portion is in a plane substantially coincident with said exhaust shroud aft end, forming an exhaust nozzle, a portion of said centerbody aft end extending rearwardly of said exhaust shroud aft end.

* * * * *